(12) United States Patent
Mao

(10) Patent No.: US 11,343,421 B2
(45) Date of Patent: May 24, 2022

(54) PHOTOGRAPHY AUXILIARY DEVICE FOR A MOBILE COMMUNICATION UNIT

(71) Applicant: SHENZHEN FENGTANG ELECTRONICS TECHNOLOGY CO., LTD., Shenzhen (CN)

(72) Inventor: Bangzhu Mao, Shenzhen (CN)

(73) Assignee: SHENZHEN FENGTANG ELECTRONICS TECHNOLOGY CO., LTD., Shenzhen (CN)

( * ) Notice: Subject to any disclaimer, the term of this patent is extended or adjusted under 35 U.S.C. 154(b) by 924 days.

(21) Appl. No.: 16/070,346

(22) PCT Filed: Jun. 25, 2018

(86) PCT No.: PCT/CN2018/092637
§ 371 (c)(1),
(2) Date: Jul. 16, 2018

(87) PCT Pub. No.: WO2019/024625
PCT Pub. Date: Feb. 7, 2019

(65) Prior Publication Data
US 2021/0211569 A1 Jul. 8, 2021

(30) Foreign Application Priority Data

Aug. 2, 2017 (CN) .......................... 201720956528.5
Apr. 28, 2018 (CN) .......................... 201820637407.9
(Continued)

(51) Int. Cl.
H04N 5/232 (2006.01)
G02B 7/02 (2021.01)
(Continued)

(52) U.S. Cl.
CPC ......... *H04N 5/23206* (2013.01); *G02B 7/022* (2013.01); *G03B 17/38* (2013.01);
(Continued)

(58) Field of Classification Search
CPC .. H04N 5/2251; H04N 5/2252; H04N 5/2254; H04N 5/23206; G03B 17/38; G03B 17/56; G03B 17/563; G03B 17/565
See application file for complete search history.

(56) References Cited

U.S. PATENT DOCUMENTS 8,244,299 B1   8/2012   Bishop
8,385,974 B1   2/2013   Bishop
(Continued)

FOREIGN PATENT DOCUMENTS

CN   204190801 U   3/2015
CN   204425416 U   6/2015
(Continued)

OTHER PUBLICATIONS

International Search Report for International patent application No. PCT/CN2018/092637, dated Sep. 7, 2018.

*Primary Examiner* — Daniel M Pasiewicz
(74) *Attorney, Agent, or Firm* — Steven M. Koehler; Westman, Champlin & Koehler, P.A.

(57) ABSTRACT

A photography auxiliary device for a mobile communication unit, including: a bottom plate (1), a lens hole (11) arranged on the bottom plate (1), a shaft (7), walls surrounding the base plate (1), a gear (6) rotatably connected to the shaft (7), and a first rack (4) and a second rack (5) at opposite ends of the gear (6); the wall includes a first side wall (2) and a second side wall (3), the first side wall (2) is provided with a groove (21), the second side wall (3) is provided with a through hole (31); an end portion of the first rack (4) is provided with a shutter button (41) located in the through (Continued)

hole (31); an end portion of the second rack (5) is provided with an elbow (51) located in the groove (21); the second rack (5) is arranged in parallel with the first rack (4). When the shutter button (41) is pressed, the elbow (51) moves upward together with the second rack (5) and presses the volume button for driving the photography.

15 Claims, 8 Drawing Sheets

(30) Foreign Application Priority Data

| Apr. 28, 2018 | (CN) | 201820637413.4 |
|---|---|---|
| Apr. 28, 2018 | (CN) | 201820637529.8 |
| Apr. 28, 2018 | (CN) | 201820637561.6 |

(51) Int. Cl.
  *H04N 5/225* (2006.01)
  *G03B 17/56* (2021.01)
  *G03B 17/38* (2021.01)

(52) U.S. Cl.
  CPC ............ *G03B 17/56* (2013.01); *H04N 5/2252* (2013.01); *H04N 5/2254* (2013.01); *G03B 17/563* (2013.01); *G03B 17/565* (2013.01)

(56) References Cited

U.S. PATENT DOCUMENTS

| 8,577,412 | B1 | 11/2013 | Bishop | |
| 9,338,267 | B2 | 5/2016 | Chang | |
| 2013/0267283 | A1* | 10/2013 | Guzman | H04N 5/2254 455/575.1 |
| 2014/0132832 | A1* | 5/2014 | Adams | G03B 17/566 348/376 |
| 2015/0181007 | A1 | 6/2015 | Chang | |
| 2019/0075235 | A1* | 3/2019 | Henry | H04B 1/3888 |

FOREIGN PATENT DOCUMENTS

| CN | 205725892 U | 11/2016 |
| CN | 206042073 U | 3/2017 |
| CN | 207218764 U | 4/2018 |
| CN | 204559646 U | 8/2018 |

* cited by examiner

PHOTOGRAPHY AUXILIARY DEVICE FOR A MOBILE COMMUNICATION UNIT

TECHNICAL FIELD

The present application relates to the technical field of photography auxiliary device, and more particularly to a photography auxiliary device for a mobile communication unit.

BACKGROUND

At present, with the continuous development of network communication technologies, it has become normal for people to use smart phones to take photos. However, when the smart phone is photographed, the virtual photograph button must be touched, however, the virtual photograph button is generally set at the left end or the right end of the mobile phone, and is often covered by the user's palm, causing great inconvenience in the photographing.

SUMMARY

An object of the present application is to provide a photography auxiliary device for a mobile communication unit in order to solve the technical problem that it is not easy to operate when using digital phone to photograph.

For achieving the above object, the technical solution adopted in the application is to provide a photography auxiliary device for a mobile communication unit, which comprises a bottom plate and walls that surrounds the periphery of the bottom plate the bottom plate; and the walls are connected with the bottom plate, and the walls and the bottom plate define an accommodating space for accommodating a smart phone, wherein a right end of the bottom plate is provided with a lens hole, a shaft is disposed at the center of the bottom plate, and the shaft is rotatably mounted with a gear, a first rack is disposed at a left end of the gear, a second rack is disposed at a right end of the gear, and the first rack and the second rack are disposed in parallel with each other and are respectively meshed with the gear; the wall comprises a first side wall and a second side wall, a groove is disposed on the first side wall, a through hole is disposed on the second side wall; and the through hole is provided therein with a shutter button connected with an end of the first rack; and the groove is provided therein with an elbow connected with an end of the second rack.

Further, a first return spring is disposed at an end of the first rack away from the shutter button.

Further, an end of the first return spring away from the first rack is fixedly connected with the first side wall.

Further, a second return spring is disposed at an end of the second rack away from the elbow.

Further, an end of the second return spring away from the second rack is fixedly connected with the second side wall.

Further, the device further comprises a gripping member disposed on a side of the bottom plate away from the shaft; a first mounting portion is convexly disposed on a side of the bottom plate away from the shaft, and a surface of the gripping member is provided with a second mounting portion matching with the first mounting portion; the gripping member is detachably connected with the bottom plate through the cooperation of the second mounting portion and the first mounting portion.

Further, the first mounting portion comprises two parallel spaced catching slots, the second mounting portion comprises two parallel spaced ribs, and the first mounting portion is provided with a plurality of positioning holes disposed at intervals between the two catching slots, the gripping member is provided with a protrusion matched with the shape of the positioning groove between the two ribs, and the gripping member is positioned at the bottom plate by the protrusion matching with the positioning groove.

Further, the gripping member comprises a housing, a cover plate detachably connected to the housing, a battery assembly accommodated in the housing, and a charging cable electrically connected with the battery assembly, the second mounting portion is disposed on a surface of the cover plate away from the housing, the cover plate is provided with a notch communicating with the inside of the housing for the charging line extending out of the housing.

Further, the charging line comprises a wire and a charging terminal connected to an end of the wire, and the cover plate is provided with a placement groove for placing the charging terminal and an accommodating groove for accommodating the wire; and the notch and the placement groove are communicated with the accommodating groove.

Further, the device further comprises an adaptive fitting disposed at the second side wall, the adaptive fitting has a pressing portion for pressing by a thumb.

Further, a mounting portion is disposed at the second side wall, and the adaptive fitting comprises the pressing portion and an insert portion connected with the pressing portion, and the insert portion is inserted into the mounting portion.

Further, the device further comprises an external accessory detachably connected to the bottom plate, and an avoidance hole corresponding to the lens hole is disposed at the external accessory.

Further, the device further comprises an external lens, and the external lens is detachably connected to the external accessory through the avoidance hole.

Further, a hanger is arranged on the external lens, and an arc-shaped boss matching with the hanger is arranged at an edge of the avoidance hole.

Further, the first rack is provided with a first oblong hole, and the bottom plate is provided with a plurality of first guide pillars located in the first oblong hole; the second rack is provided with a second oblong hole, and the bottom plate is provided with a plurality of second guide pillars located in the second oblong hole.

The benefit effect of the application is that the photography auxiliary device for the mobile communication unit sleeves outside the smart phone, and the elbow corresponds to the volume button for driving photograph function, and it's easy to take pictures by pressing the shutter button to drive the elbow to press the volume button.

BRIEF DESCRIPTION OF THE DRAWINGS

In order to make the technical solutions in the embodiments of the present application clearer, the accompanying drawings to be used in the embodiments and the description of the prior art will be briefly introduced below, it is apparent that the drawings in the following description are merely some embodiments of the present application and that other drawings may be obtained by those skilled in the field without departing from the inventive nature of the invention.

Figure 1:
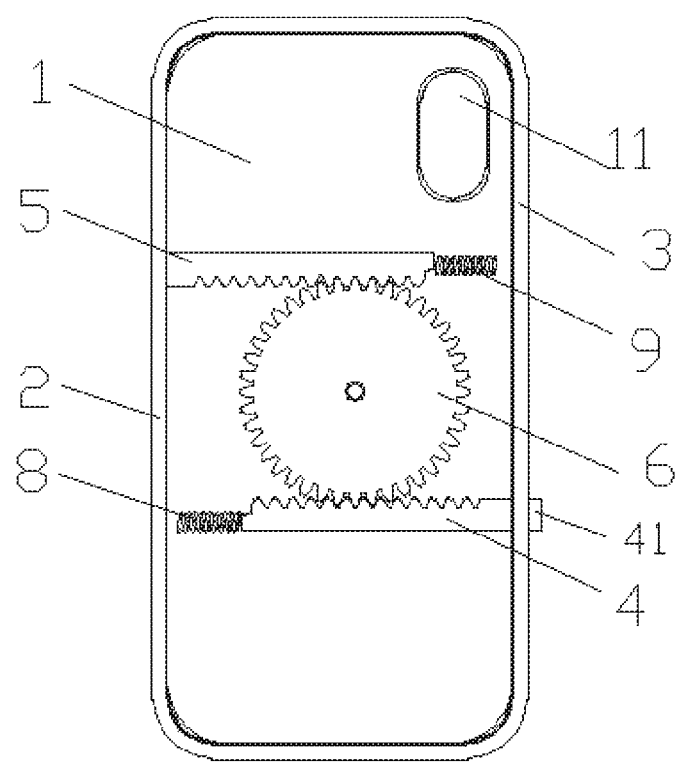
FIG. 1 is a front view of a photography auxiliary device for a mobile communication unit provided by one of embodiment of the application.

Wherein:
1, bottom plate; 11, lens hole; 12, first mounting portion; 121, catching slot; 122, positioning groove; 13, first guide pillar; 14, second guide pillar;
2, first side wall; 21, groove;
3, second side wall; 31, through hole; 32, mounting portion;
4, first rack; 41, shutter button; 42, first oblong hole;
5, second rack; 51, elbow; 52, second oblong hole;
6, gear;
7, shaft;
8, first return spring;
9, second return spring;
10, gripping member; 101, second mounting portion; 1011, ribs; 102, protrusion; 103, housing; 104, cover plate; 1041, notch; 1042, placement groove; 1043, accommodating groove; 1044, U-shaped groove; 1045, convex piece; 105, battery assembly; 106, charging line; 1061, wire; 1062, charging terminal;
20, adaptive fitting; 201, pressing portion; 202, insert portion;
30, external accessory; 301, avoidance hole; 3011, curved boss;
40, external lens; and 401, hanger.

DETAILED DESCRIPTION OF THE EMBODIMENTS

In order to make the technical problems to be solved, technical solutions, and beneficial effects of the present application clearer and more understandable, the present application will be further described in detail herein after with reference to the accompanying drawings and embodiments. It should be understood that the embodiments described herein are only intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

It should be understood that, "length", "width", "upper", "lower", "front", "back", "left" and "right", "vertical", "horizontal", "top", "bottom", "inside", "outside" and other terms indicating the orientation or positional relationship are based on orientation or positional relationship shown in the drawings, and are only for the purpose of facilitating the description of the application and simplifying the description, instead of indicating or implying that the indicated device or component must have a specific orientation and constructed and operated in a particular orientation, and therefore it cannot be construed as limitation of the application.

In addition, the terms "first" and "second" are for illustrative purposes only and should not be construed as indicating or implying a relative importance or implicitly indicating the quantity of technical features indicated. Therefore, a feature that defines "first" and "second" may expressly or implicitly include one or more of the features. In the description of the present application, "multiple" means two or more than two, unless otherwise specifically defined.

a photography auxiliary device for a mobile communication unit provided by the application is described with reference to FIG. 1 to FIG. 10.

Figure 2:
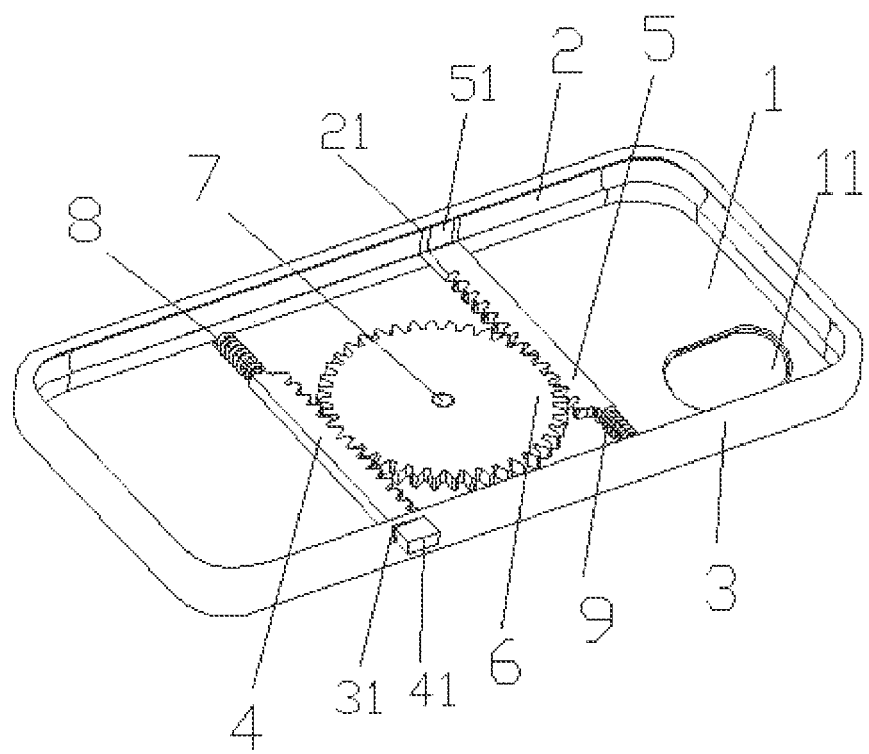
FIG. 2 is a side view of the photography auxiliary device for the mobile communication unit shown in FIG. 1.

As shown in FIG. 1 and FIG. 2, a photography auxiliary device for a mobile communication unit provided according to an embodiment of the present application, comprises: a bottom plate 1 and walls around four peripheral edges of the bottom plate 1; the walls are connected with the bottom plate 1, the walls and the bottom plate 1 form an accommodating space for accommodating the smart phone. The wall comprises a first side wall 2 and a second side wall 3, the first side wall 2 is provided with a groove 21, and the second side wall 3 is provided with a through hole 31. A right end of the bottom plate 1 is provided with a lens hole 11, a shaft 7 is disposed at the center thereof, a gear 6 is rotatably mounted at the shaft 7, a first rack 4 is disposed at a left end of the gear 6, and a second rack 5 is disposed at a right end of the gear 6, the first rack 4 and the second rack 5 are disposed parallel to each other and respectively meshed with the gear 6. A first return spring 8 is mounted at a rear end of the first rack 4, and a shutter button 41 is provided at a front end thereof, the shutter button 41 outwards through the through hole 31. A rear end of the second rack 5 is provided with an elbow 51, and a second return spring 9 is mounted at a front end thereof. The other end of the first return spring 8 is fixed to the first side wall 2. The other end of the second return spring 9 is fixed to the second side wall 3. The elbow 51 sinks within the groove 21.

Compared to the prior art, in the photography auxiliary device for the mobile communication unit provided by the embodiment, the smart phone is firstly put into the photography device when uses the photography auxiliary device, the phone lens is allowed corresponds to the lens hole 11, the elbow 51 is allowed corresponds to the volume button, and the shutter button 41 is allowed upwards. When the shutter button 41 is pressed, the first rack 4 drives the gear 6 to rotate in the clockwise direction, the second rack 5 is driven upward by the gear 6, and the elbow 51 moves upward along with the second rack 5, thereby pressing the volume button, then the phone takes a picture. After used, the finger pressing the shutter button 41 is released, and under the double action of the first return spring 8 and the second return spring 9, the gear 6 rotates counterclockwise, and the elbow 51 is returned to the groove 21, the volume button is released.

Further, referring to FIG. 3 to FIG. 10, a photography auxiliary device for a mobile communication unit provided as another embodiment of the present application, the device further comprises a gripping member 10 disposed on a side of the bottom plate 1 away from the shaft 7; a first mounting portion 12 is convexly disposed on a side far away from the shaft 7; a second mounting portion 101 is disposed on a surface of the gripping member 10 to cooperate with the first mounting portion 12, and the gripping member 10 is detachably connected with the bottom plate 1 through the cooperation of the second mounting portion 101 and the first mounting portion 12. Specifically, the second mounting portion 101 is disposed on the surface of the gripping member 10, and the gripping member 10 is detachably connected to the bottom plate 1 through the cooperation of the second mounting portion 101 and the first mounting portion 12. In such design manner, when a user holds a mobile phone in one hand to record a video or take a picture or watch a video, the gripping member 10 can be held by four fingers except the thumb, and the bending of the four fingers conforms to ergonomic, such that the holding is comfortable and the experience is good.

Figure 4:
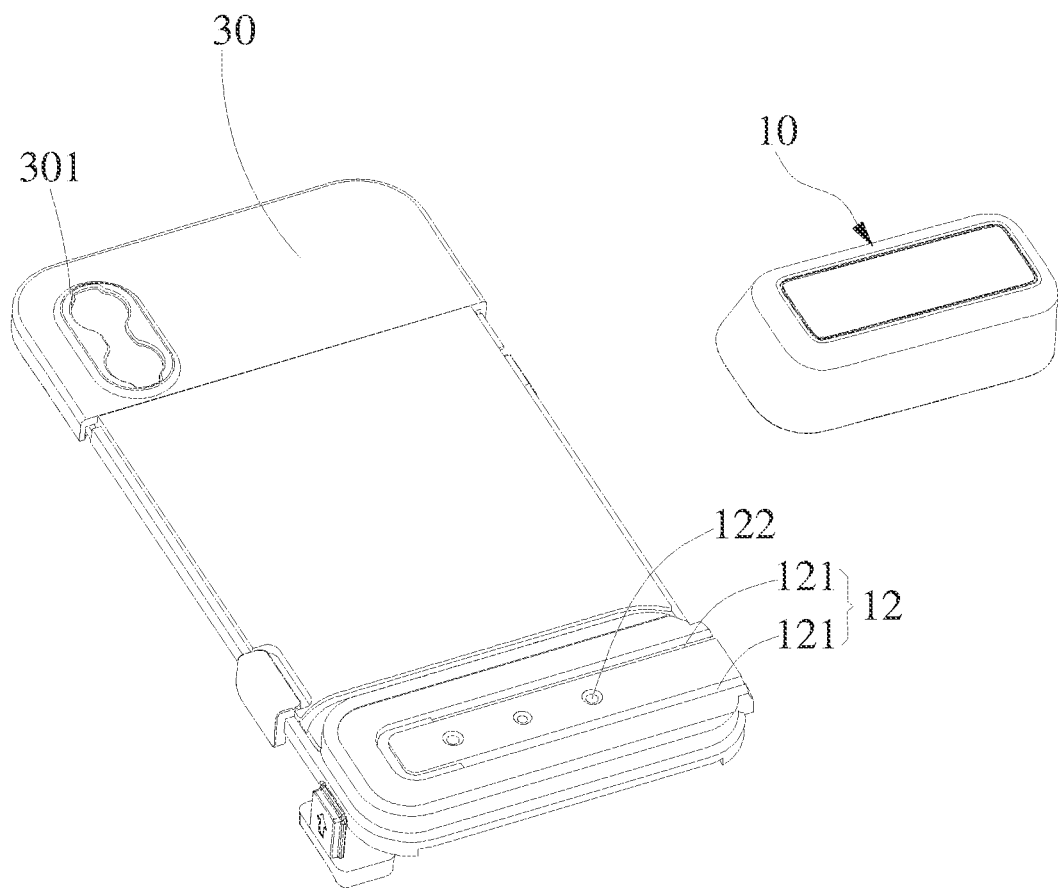
FIG. 4 is an exploded view of the photography auxiliary device for the mobile communication unit shown in FIG. 3.

Further, referring to FIG. 4, as a specific embodiment of a photography auxiliary device for a mobile communication unit provided by the present application, the first mounting portion 12 comprises two parallel-arranged catching slots 121, and the second mounting portion 101 comprises two parallel spaced ribs 1011, the first mounting portion 12 is provided with a plurality of positioning holes 122 disposed at intervals between the two catching slots 121, the gripping member 10 is provided with a protrusion 102 matched with the shape of the positioning groove 122 between the two ribs 1011, and the gripping member 10 is positioned on the bottom plate 1 through the cooperation of the protrusions 102 and the positioning groove 122. Specifically, the gripping member 10 is inserted into the back of the bottom plate 1 through the cooperation of the rib 1011 and the catching slot 121. It can be understood that the positions of the catching slot 121 and the rib 1011 can be interchanged, that is, the catching slot 121 is disposed at the second mounting portion 101, and the rib 1011 is disposed at the first mounting portion 12 as long as the gripping member 10 may be inserted into the back surface of the bottom plate 1 through the cooperation of the rib 1011 and the catching slot 121.

Figure 5:
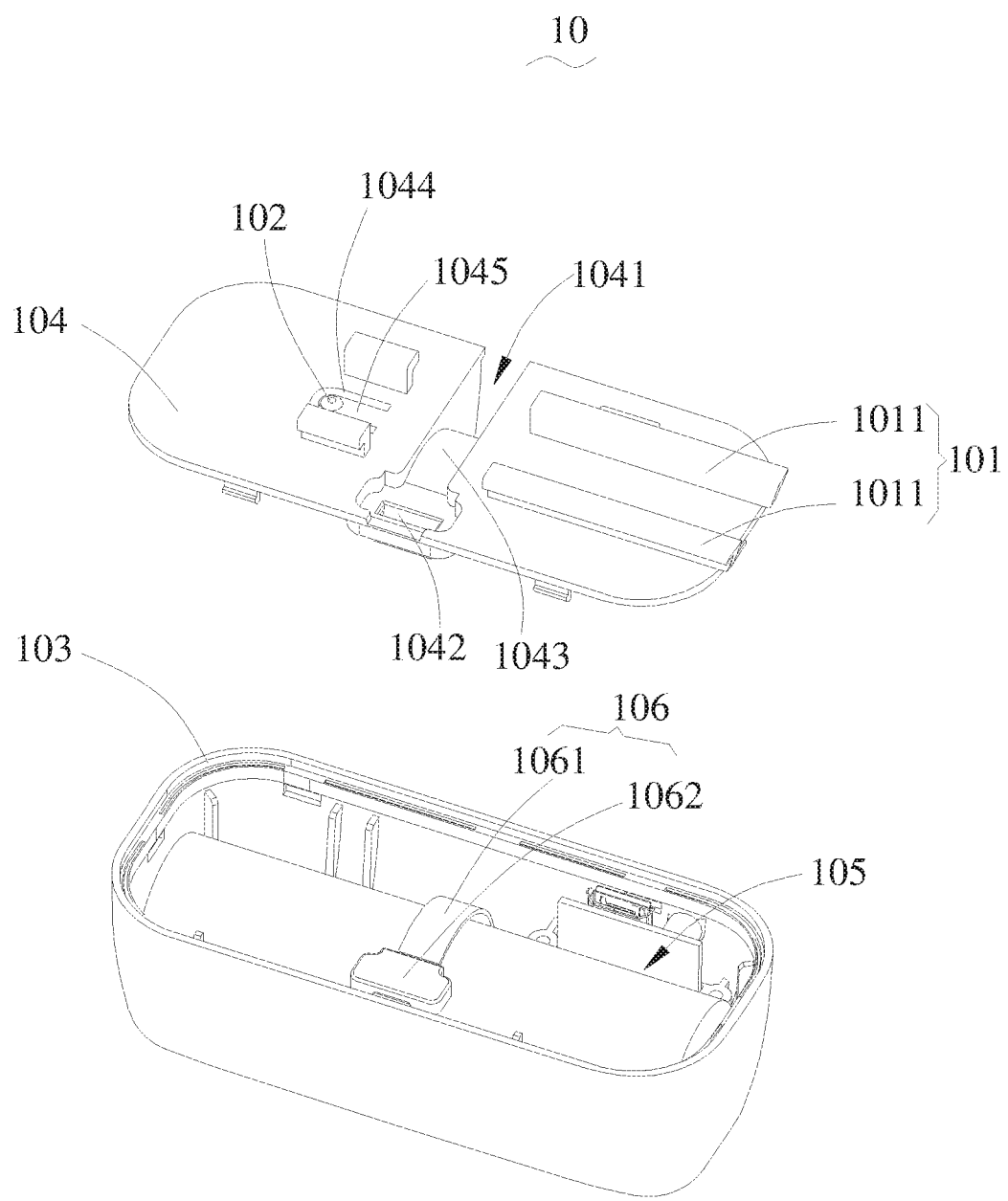
FIG. 5 is an exploded view of a gripping member according to an embodiment of the present application.
Figure 6:
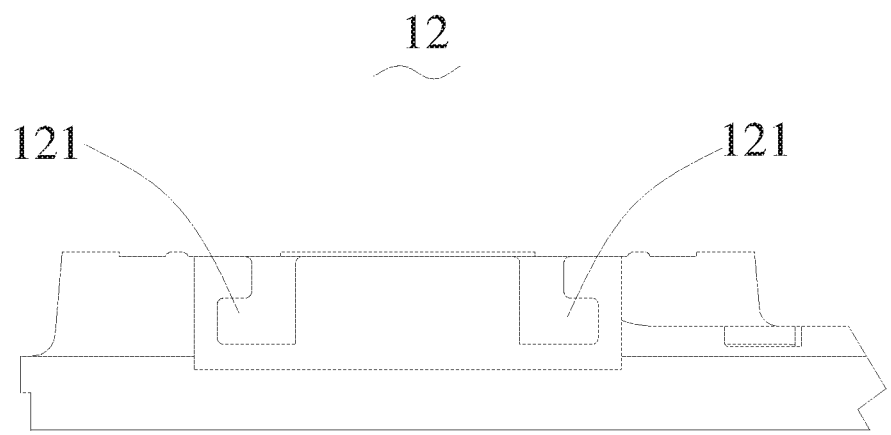
FIG. 6 is a schematic structural view of a first mounting portion according to an embodiment of the present application.
Figure 7:
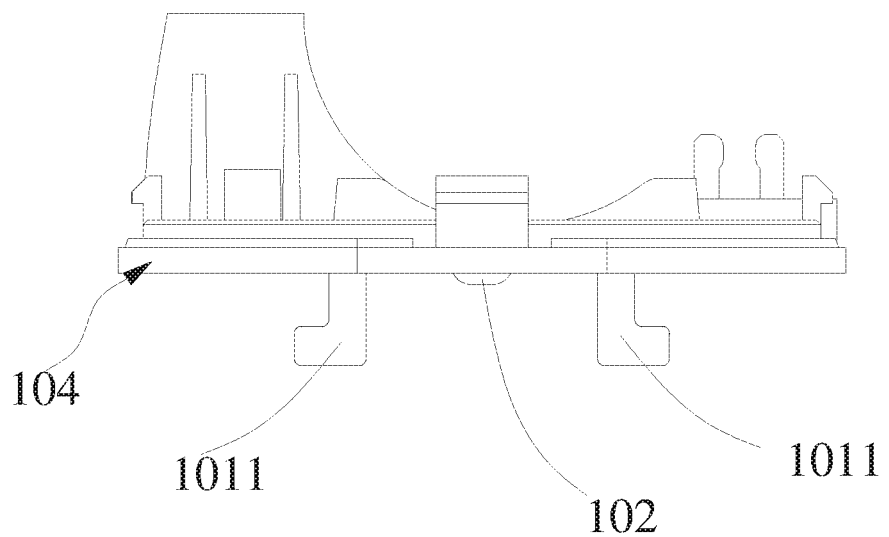
FIG. 7 is a schematic structural view of a cover plate according to an embodiment of the present application.

Further, please refer to FIG. 5, as a specific embodiment of a photography auxiliary device for a mobile communication unit provided by the present application, the gripping member 10 comprises a housing 103, and a cover plate 104 detachably connected to the housing 103, a battery assembly 105 accommodated in the housing 103 and the charging line 106 electrically connected to the battery assembly 105; the cover plate 104 is disposed on a surface of the cover plate 104 away from the housing 103, and the cover plate 14 is provided with a notch 1041 communicating with the inside of the housing 103 for the charging line 106 extending out of the housing 103. Specifically, in this design manner, by the battery assembly 105 and the charging line 106 are disposed in the gripping member 10, so that the gripping member 10 can also be used as a mobile power source while being installed on the bottom plate 1, which is very convenient. The cover plate 104 defines a U-shaped groove 1044 formed in the periphery of the protrusion 102 and forms a convex piece 1045 extending toward the bottom of the U-shaped groove 1044, the protrusion 102 is disposed on the convex piece 1045. By providing the convex piece 1045, the convex piece 1045 can play a role of elastic buffering during assembly of the gripping member 10 and the bottom plate 1, so that the gripping member 10 can be more easily assembled to the bottom plate 1 and the bottom plate 1 can effectively reduce wear to the protrusion 102.

Further, please refer to FIG. 5, as a specific embodiment of a photography auxiliary device for a mobile communication unit provided by the present application, the charging line 106 comprises a wire 1061 and a charging terminal 1062 connected to an end of the wire 1061, the cover plate 104 is provided with a placement groove 1042 for placing the charging terminal 1062, and an accommodating groove 1043 for accommodating the wire 1061, and the accommodating groove 1043 communicates with the notch 1041 and the placement groove 1042. Specifically, the cover plate 104 is provided with a placement groove 1042 for placing the charging terminal 1062 and an accommodating groove 1043 for accommodating the wire 1061. Therefore, when the charging assembly is not used, the charging terminal 1062 can be placed in the placement groove 1042, the 1061 can be accommodated in the accommodating groove 1043 so that the charging assembly is clean and tidy.

Figure 3:
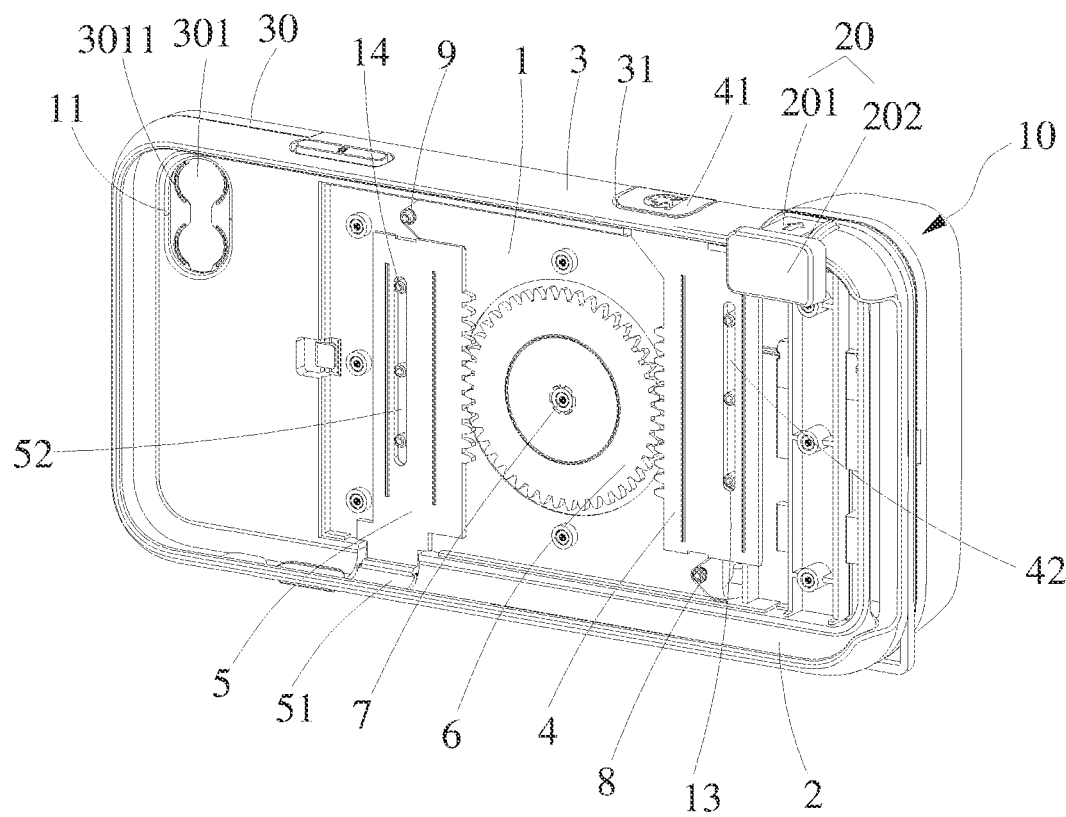
FIG. 3 is a schematic structural view of a photography auxiliary device for a mobile communication unit according to another embodiment of the application.
Figure 8:
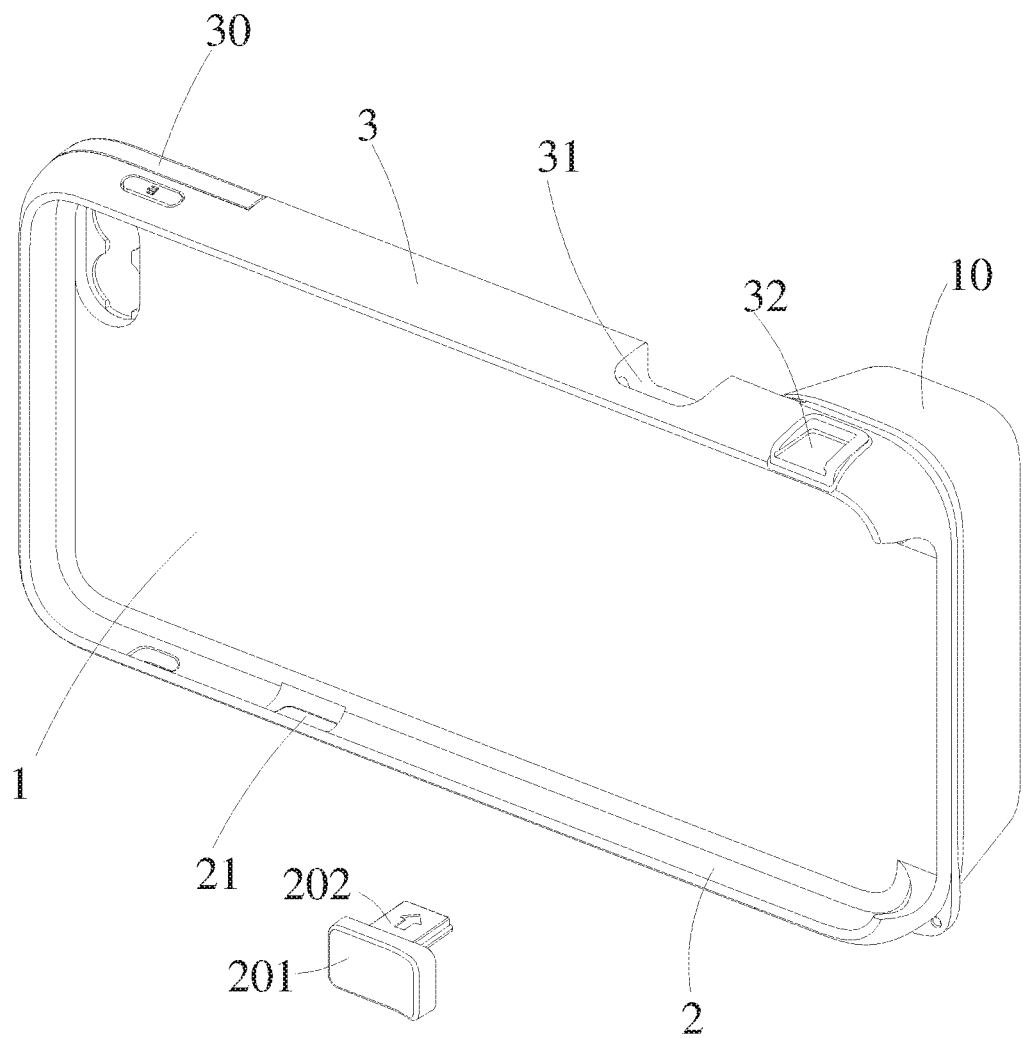
FIG. 8 is a schematic structural view of a bottom plate according to an embodiment of the present application.

Further, please refer to FIG. 3 and FIG. 8, as a specific embodiment of a photography auxiliary device for a mobile communication unit provided by the present application, the device further comprises an adaptive fitting 20 disposed on the second side wall 3, the adaptive fitting 20 has a pressing portion 201 for pressing by the thumb. Specifically, in this design manner, when a user holds a mobile phone in one hand to record a video or take a picture or watch a video, the user's thumb can press on the adaptive fitting 20, and the user's thumb does not touch the screen of the mobile phone. Which the recording of the video or the photographing or the watching of the video may not be hindered, and due to the convexly arranged of the adaptive fitting 20, the overall thickness of the phone, the photography auxiliary device for the mobile communication unit and the adaptive fitting 20 is larger, and the user is comfortable to hold one hand and have a better experience.

Further, please refer to FIG. 8, as an embodiment of a photography auxiliary device for a mobile communication unit provided by the present application, the second sidewall 3 is provided with a mounting portion 32, and the adaptive fitting 20 comprises the pressing portion 201 and an insert portion 202 connected to the pressing portion 201, the insert portion 202 is inserted into the mounting portion 32. Specifically, the insertion portion 202 is inserted into the mounting portion 32 to realize that the adaptive fitting 20 is mounted on the second side wall 3.

Further, please refer to FIG. 3, as a specific embodiment of a photography auxiliary device for a mobile communication unit provided by the present application, the device further comprises an external accessory 30 detachable connected to the bottom plate 1, the external accessory 30 is provided with an avoidance hole 301 corresponding to the lens hole 11. Specifically, in this design manner, the user can replace the external accessory 30 to make the photography auxiliary device having variability, such as replacing the external accessory 30 of different colors or different shapes, therefore, the user does not experience aesthetic fatigue, the experience is better, and having big market share.

Figure 9:
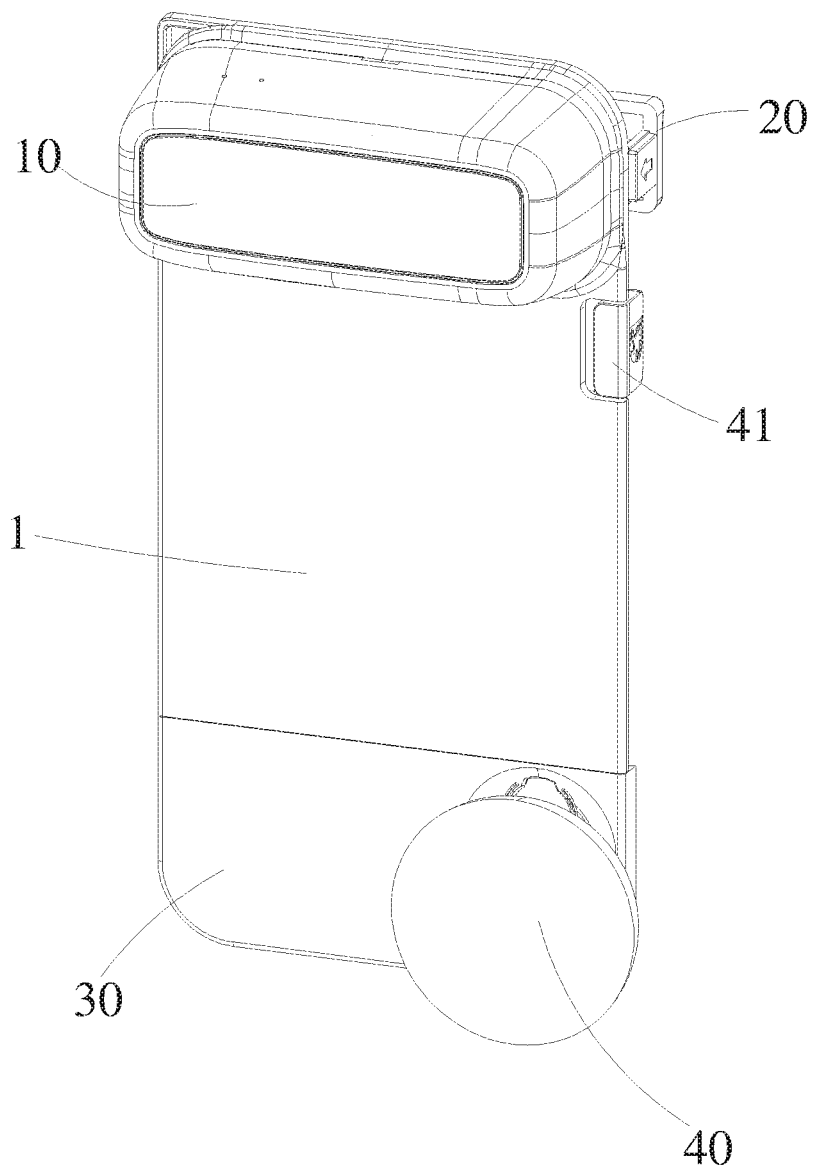
FIG. 9 is a schematic structural view of a photography auxiliary device for a mobile communication unit provided with an external lens according to an embodiment of the present application.
Figure 10:
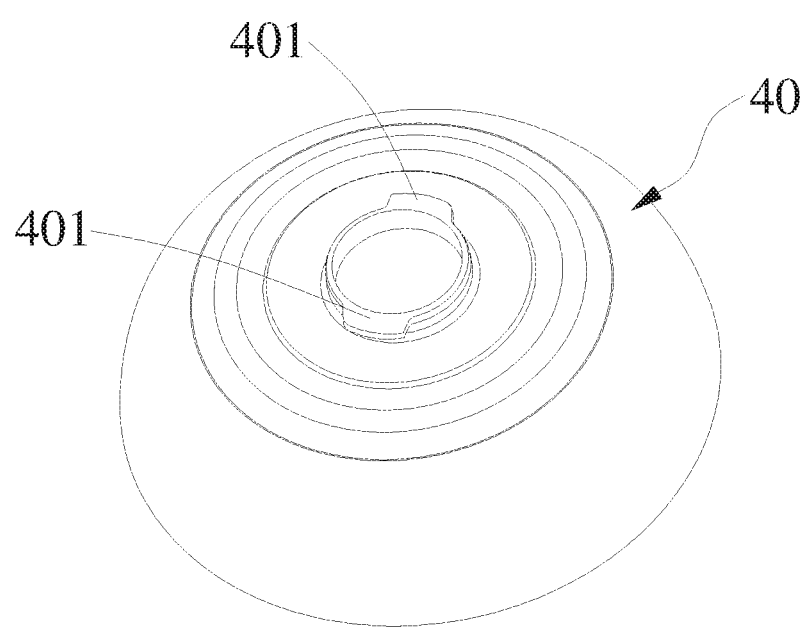
FIG. 10 is a schematic structural diagram of an external lens according to an embodiment of the present application.

Further, please refer to FIG. 9 and FIG. 10, as a specific embodiment manner of a photography auxiliary device for a mobile communication unit provided by the present application, the method further comprises an external lens 40, the external lens 40 is detachably connected to the external accessory 30 through the avoidance hole 301. Specifically, the external lens 40 is detachably connected to the external accessory 30 to further enhance the effect of the photography.

Further, please refer to FIG. 10, as a specific embodiment of a photography auxiliary device for a mobile communication unit provided by the present application, the external lens 40 is provided with a hanger 401, and an edge of the avoidance hole 301 is provided with a curved boss 3011 matching with the hanger 401. Specifically, the process of attaching the external lens 40 to the external accessory 30 is as follows: the hanger 401 on the external lens 40 is inserted into the avoidance hole 301 and then rotates the external lens 40 to clamp the hanger 401 and the curved boss 3011, therefore realizing the external lens 40 is detachably connected to the external accessory 30. When there are a plurality of lenses on a mobile device such as a mobile phone, the external lens 40 may be selectively attached to a position corresponding to a lens on a certain mobile phone in the avoidance hole 301.

Further, please refer to FIG. 3, as a specific embodiment of a photography auxiliary device for a mobile communication unit provided by the present application, the first rack 4 is provided with a first oblong hole 42, and the bottom plate 1 is provided with a plurality of first guide pillars 13 located in the first oblong hole 42; the second rack 5 is provided with a second oblong hole 52, and the bottom plate 1 is provided with a plurality of second guide pillars 14 located in the second oblong hole 52. Specifically, in order to ensure a more stable sliding of the first rack 4 along the surface of the bottom plate 1, the first oblong hole 42 is arranged on the first rack 4, so that the first rack 4 slides along the first guide pillar 13 through the first oblong hole 42; in order to ensure a more stable sliding of the second rack 5 along the surface of the bottom plate 1, the second oblong hole 52 is arranged on the second rack 5, so that the second rack 5 slides along the second guide pillar 14 through the second oblong hole 52. At the same time, a closing plate is arranged on the side of the first rack 4 and the second rack 5 away from the bottom plate 1, and the first rack 4, the second rack 5, the gear 6, and the shaft 7 or the like are mounted on the bottom plate 1.

The aforementioned embodiments are only preferred embodiments of the present application, and are not intended to limit the present application. Any modification, equivalent replacement, improvement, and so on, which are made within the spirit and the principle of the present application, should be comprised in the scope of the present application.

What is claimed is:

1. A photography auxiliary device for a mobile communication unit, wherein comprising: a bottom plate and walls that surrounds the periphery of the bottom plate; and the walls are connected with the bottom plate, and the walls and the bottom plate define an accommodating space for accommodating a smart phone; wherein: a right end of the bottom plate is provided with a lens hole, a shaft is disposed at the center of the bottom plate, and a gear is rotatably mounted onto the shaft, a first rack is disposed at a left end of the gear, a second rack is disposed at a right end of the gear, and the first rack and the second rack are disposed in parallel with each other and are respectively meshed with the gear; the wall comprises a first side wall and a second side wall, a groove is disposed in the first side wall, a through hole is disposed in the second side wall; and the through hole is provided therein with a shutter button which is connected with an end of the first rack; and the groove is provided therein with an elbow which is connected with an end of the second rack.

2. The photography auxiliary device for the mobile communication unit of claim 1, wherein a first return spring is disposed at an end of the first rack away from the shutter button.

3. The photography auxiliary device for the mobile communication unit of claim 2, wherein an end of the first return spring away from the first rack is fixedly connected with the first side wall.

4. The photography auxiliary device for the mobile communication unit of claim 1, wherein a second return spring is disposed at an end of the second rack away from the elbow.

5. The photography auxiliary device for the mobile communication unit of claim 4, wherein an end of the second return spring away from the second rack is fixedly connected with the second side wall.

6. The photography auxiliary device for the mobile communication unit of claim 1, wherein the device further comprises a gripping member disposed on a side of the bottom plate away from the shaft; a first mounting portion is convexly disposed on a side of the bottom plate away from the shaft, and a surface of the gripping member is provided with a second mounting portion matching with the first mounting portion; the gripping member is detachably connected with the bottom plate through the cooperation of the second mounting portion and the first mounting portion.

7. The photography auxiliary device for the mobile communication unit of claim 6, wherein the first mounting portion comprises two parallel spaced catching slots, the second mounting portion comprises two parallel spaced ribs, and the first mounting portion is provided with a plurality of positioning holes disposed at intervals between the two catching slots, the gripping member is provided with a protrusion matched with the shape of the positioning groove between the two ribs, and the gripping member is positioned at the bottom plate by the protrusion matching with the positioning groove.

8. The photography auxiliary device for the mobile communication unit of claim 6, wherein the gripping member comprises a housing, a cover plate detachably connected to the housing, a battery assembly accommodated in the housing, and a charging cable electrically connected with the battery assembly, the second mounting portion is disposed on a surface of the cover plate away from the housing, the cover plate is provided with a notch communicating with the inside of the housing for the charging line extending out of the housing.

9. The photography auxiliary device for the mobile communication unit of claim 8, wherein the charging line comprises a wire and a charging terminal connected to an end of the wire, and the cover plate is provided with a placement groove for placing the charging terminal and an accommodating groove for accommodating the wire; and the notch and the placement groove are communicated with the accommodating groove.

10. The photography auxiliary device for the mobile communication unit of claim 1, wherein the device further comprises an adaptive fitting disposed at the second side wall, the adaptive fitting has a pressing portion for pressing by a thumb.

11. The photography auxiliary device for the mobile communication unit of claim 10, wherein a mounting portion is disposed at the second side wall, and the adaptive fitting comprises the pressing portion and an insert portion connected with the pressing portion, and the insert portion is inserted into the mounting portion.

12. The photography auxiliary device for the mobile communication unit of claim 1, wherein the device further comprises an external accessory detachably connected to the bottom plate, and an avoidance hole corresponding to the lens hole is disposed at the external accessory.

13. The photography auxiliary device for the mobile communication unit of claim 12, wherein the device further comprises an external lens, and the external lens is detachably connected to the external accessory through the avoidance hole.

14. The photography auxiliary device for the mobile communication unit of claim 13, wherein a hanger is arranged on the external lens, and an arc-shaped boss matching with the hanger is arranged at an edge of the avoidance hole.

15. The photography auxiliary device for the mobile communication unit of claim 1, wherein the first rack is provided with a first oblong hole, and the bottom plate is provided with a plurality of first guide pillars located in the first oblong hole; the second rack is provided with a second oblong hole, and the bottom plate is provided with a plurality of second guide pillars located in the second oblong hole.

\* \* \* \* \*